(12) United States Patent
Huitema et al.

(10) Patent No.: US 6,750,607 B2
(45) Date of Patent: Jun. 15, 2004

(54) DISPLAY DEVICE

(75) Inventors: Hjalmar Edzer Ayco Huitema, Eindhoven (NL); Karel Elbert Kuijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 321 days.

(21) Appl. No.: 10/086,707

(22) Filed: Mar. 1, 2002

(65) Prior Publication Data
US 2002/0130614 A1 Sep. 19, 2002

(30) Foreign Application Priority Data
Mar. 6, 2001 (EP) .............................................. 01200838

(51) Int. Cl.$^7$ ................................................. H01J 1/62
(52) U.S. Cl. ....................... 313/500; 313/505; 313/506; 313/511; 313/512
(58) Field of Search .................................. 313/500, 505, 313/506, 511, 512

(56) References Cited

U.S. PATENT DOCUMENTS 6,025,892 A    2/2000  Kawai et al. .................. 349/43

OTHER PUBLICATIONS

U.S. Patent Application Publication, Izumi et al., "Active matrix substrate, method of manufacturing the same, and display image–capturing device utilizing the same" US 2001/0019374 a1, Sep. 6, 2001.

*Primary Examiner*—Vip Patel

(57) ABSTRACT

In flexible AM-LCDs using plastic TFT transistors (8), based on bottom gate, the signal distortion on the data lines (6) or selection lines (5) is reduced by adding metal strips (15, 25) per pixel, attached to said data lines (by vertical interconnections (16)), to provide a low-ohmic shunt.

11 Claims, 2 Drawing Sheets

DISPLAY DEVICE

Figure 1:
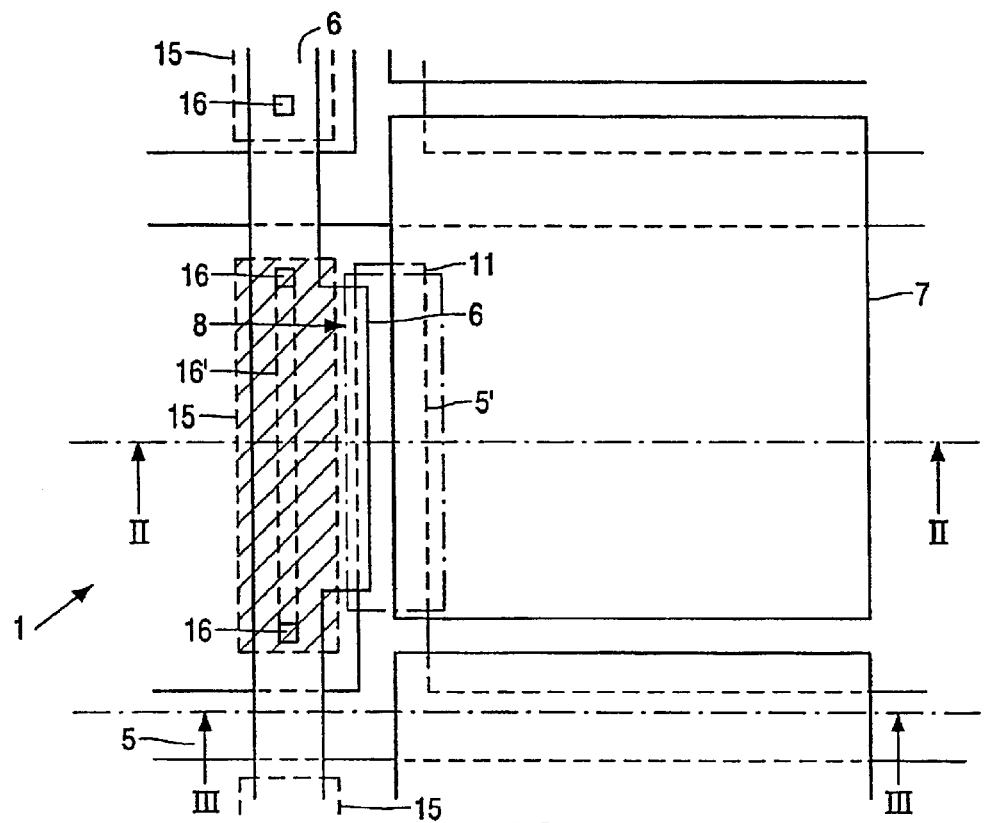

The invention relates to a display device comprising a flexible substrate with a matrix of pixels on the substrate, switching elements which are selectable by means of row electrodes for presenting data, which have been presented via column electrodes, to the pixels.

Examples of such active matrix display devices are the TFT-LCDs or AM-LCDs which are used in laptop computers and in organizers, but they also find an increasingly wider application in GSM telephones.

The use of such display devices in "white paper" applications is also increasingly considered. The display devices then have the appearance of a newspaper. Since the substrate is flexible, it can be partly or not partly folded. This flexibility also provides possibilities of applications in "wearable displays". Instead of LCDs, for example, organic or polymer LED display devices may be used alternatively.

However, problems may occur when the substrates are often bent or bent too much. To ensure a satisfactory flexibility, a polymer material such as, for example, polyaniline (PANI), polyethylene-dioxythiophene (poly-DOT), pentacene, poly(thienylene vinylene) (PTV) or poly-3-hexylthiophene (P3HT) are preferably chosen for all materials to be used, i.e. also for the materials for the column electrodes and the row electrodes, the insulating layers and the semiconductor materials.

A drawback of the use of polyaniline (PANI) as a conducting material is its high resistance; the sheet resistance is about $1,5.10^3 \Omega/$(at a layer thickness of 200 nm). If this is used for a column conductor with a width of about 25 $\mu$m and dimensions of the pixels in the direction of a column conductor of about 540 $\mu$m, the resistance along each pixel is about 35 k$\Omega$. The provision of a double layer of PANI with, for example, a metal may provide a solution, but the conventional materials adhere poorly to the PANI or are not very attractive for other reasons (etching rate differences). The structuring of a metal provided on an organic layer, or PANI is not possible in practice or causes great problems.

It is an object of the present invention to obviate this problem and to this end, the invention provides a display device with a flexible substrate, in which parts of the column electrodes are arranged parallel to mutually separate strips of a conducting material insulated from the column electrodes, or parts of the row electrodes are arranged parallel to strips of a conducting material insulated from the row electrodes.

The invention is based on the recognition that it is possible to provide a strip of a satisfactorily conducting material parallel to the high-ohmic column electrodes or row electrodes, which strip is, as it were, already broken in a defined way. The separate parts are then arranged parallel to the high-ohmic conductors via feed-throughs.

The strips of conducting material preferably have a dimension which, in the direction of the relevant electrode, is substantially equal to the dimension of the pixel in this direction, reduced by the width of an electrode in the direction transverse (perpendicular) thereto (at least in matrix with transversely crossing column electrodes and row electrodes).

Since the row electrodes are usually subjected to the heaviest capacitive load, the strips of a conducting material and the row electrodes are made of the same low-ohmic material in a preferred embodiment. Since they can be manufactured (bottom-gate configuration) on one level (directly on the substrate), a metal can be used for this purpose and no extra masking step is required.

These and other aspects of the invention are apparent from and will be elucidated with reference to the embodiments described hereinafter.

Figure 2:
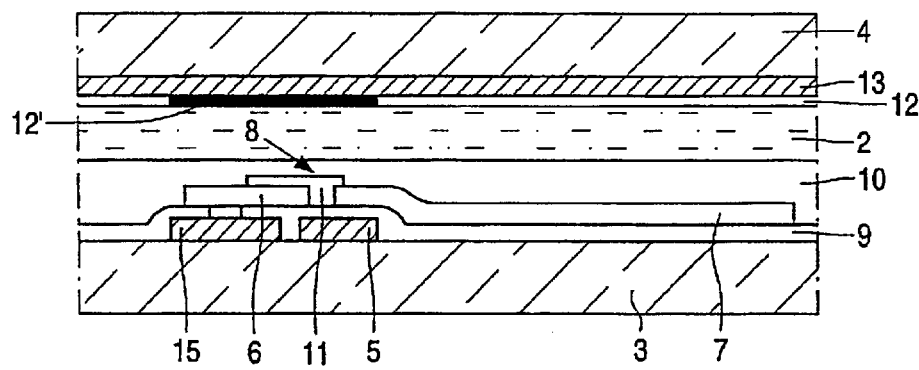
Figure 3:
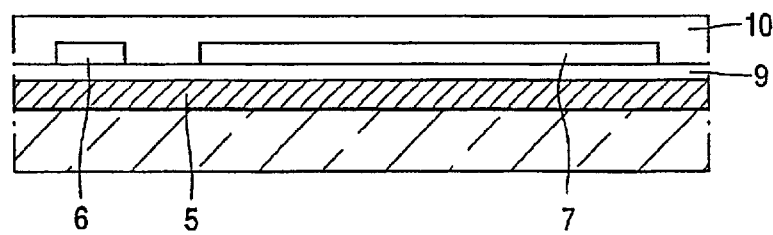
Figure 4:
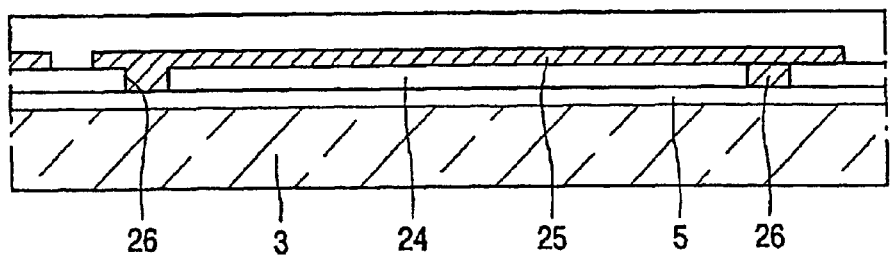
Figure 5:
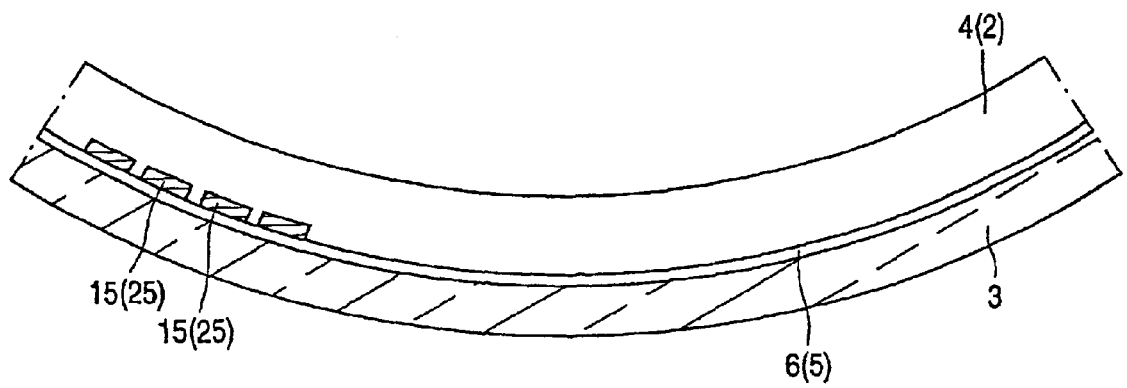
Figure 6:
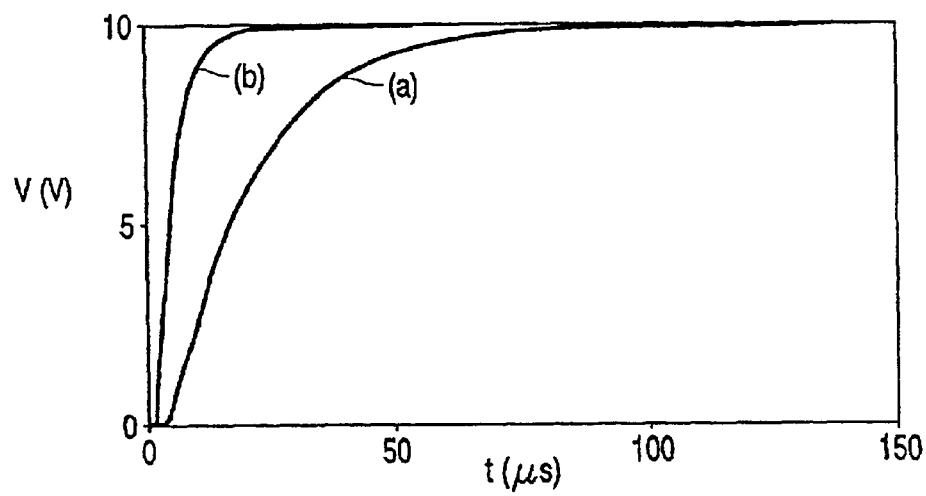

In the drawings:

FIG. 1 is a diagrammatic plan view of a possible embodiment of a part of a display device according to the invention, FIG. 2 is a diagrammatic cross-section taken on the line II—II in FIG. 1, FIG. 3 is a diagrammatic cross-section taken on the line III—III in FIG. 1, while FIG. 4 is a cross-section of another embodiment, and FIGS. 5 and 6 show some advantages of a display device according to the invention.

The Figures are diagrammatic and not drawn to scale. Corresponding elements are generally denoted by the same reference numerals.

FIG. 1 is a plan view and FIGS. 2, 3 are cross-sections of a part of a display device according to the invention.

FIG. 1 is a plan view of a display device 1 to which the invention is applicable. It comprises a matrix of pixels, of which FIG. 1 shows a picture electrode 7 at the area of a crossing of a row electrode, or selection electrode, 5 and a column electrode, or data electrode, 6. FIG. 1 further shows a TFT transistor 8, whose source electrode is constituted by a part of the column electrode 6, while a part of the picture electrode 7 functions as a drain and a projecting portion 5' of the row electrode functions as a gate electrode (see also the cross-section in FIG. 2).

FIG. 2 is a diagrammatic cross-section of a part of a light-modulating cell with, for example, a liquid crystal material 2, in this example PDLC (polymer-dispersed liquid crystal) which is present between two substrates 3, 4 of a flexible material such as synthetic material (for example, polyethylene). The first substrate 3 is provided with a plurality of row electrodes 5 of, for example, aluminum or another suitable metal (gold, chromium, copper), combinations of metals or a double layer of a metal layer and a conducting polymer which have a projecting portion 5' at the location of TFT transistors 8, which portion functions as a gate electrode. The gate electrode and a metal strip 15 to be further described (which is provided, for example, simultaneously with the row electrodes 5) is provided with an insulating layer 9 functioning as a gate dielectric at the location of the projecting portions 5'. For this layer, a polymer material such as, for example, polyphenyl vinol (PVP) or a photoresist is chosen. The insulating layer 9 is provided with column electrodes 6 and patterned picture electrodes 7 of, for example, polyaniline (PANI) or polyethylene-dioxythiophene (poly-DOT). A patterned layer of semiconductor material (for example, a polymer material such as pentacene, polythienylene (PTV) or poly-3-hexylthiophene (P3HT) is present at the location of the gate electrode between the column electrodes 6 and the picture electrodes. Such a layer of semiconductor material constitutes a TFT transistor 8, together with parts of a column electrode 6 and a picture electrode 7, and together with the gate electrode 5' and the intermediate insulating layer 9. A layer 10 of, for example, a photoresist is provided as a protective coating on the row and column electrodes, the picture electrodes 7 and the TFT transistors 8.

A transparent counter electrode 13 of, for example, ITO (indium tin oxide) or polyethylene-dioxythiophene (poly-DOT or pDOT) is present on the other substrate 4. In this example, the electrode 13 is provided with a color filter 12, with a black mask 12 opposite the TFT transistor 8.

To ensure a satisfactory flexibility of the display device, organic materials have been chosen as materials for the column electrodes and the picture electrodes and for the semiconductor materials and the liquid crystal material. For example, PDLC is very suitable for the liquid crystal effect.

In this example, a satisfactorily conducting metal such as Al, Au, Cr or Cu with a thickness of 200 nm is chosen for the row electrodes, so that the flexibility is ensured, while the resistance is low enough to switch on the lines fast enough.

As already stated, a metal strip 15 which is interrupted at the area of the crossings with the row electrodes 5 is also present on the first substrate 3. The separate parts of the metal strip 15 are connected in an electrically conducting manner near their ends to the column electrodes 6 via through-metallizations 16 in the insulating layer 9. In this way, "shunts" are obtained (parallel arranged satisfactorily conducting strips) which considerably reduce the effective sheet resistance of the column electrodes 6 (by a factor of about 6) to a value below 250Ω/.

FIG. 4 shows another possible cross-section, in which the row electrodes (and the gate electrodes) are also provided with such shunts. In the relevant case, the separate strips 25 are separated from the ITO or metal conductor 5 by an extra insulating layer 24, but this is not strictly necessary.

FIG. 5 shows an extra advantage of providing the metallization in separate strips 15, 25, parallel to the conductor tracks 6 (5) of flexible material on a flexible substrate 3. The other (similarly flexible) parts of the display device are shown diagrammatically (reference numerals 2, 4). By dividing the conductor into discrete strips 15, the conductor will not break when the substrate is bent to a considerable curvature.

FIG. 6 shows the advantage of the metallization, parallel to the conductor tracks 6 with respect to the switching rate. Curve (a) shows the voltage at the end of the data line 6, if polyaniline (PANI) is used as a conducting material with a sheet resistance of about $1,5.10^3 \Omega/$, a width of 25 micrometers of the electrodes and a length of 34.56 millimeters. In this example, the display device has 64 rows. The column was driven with a step function. The much faster response which is achieved in the device according to the invention, because the sheet resistance is reduced to about $0,25.10^3 \Omega/$ with the metallization, parallel to the conductor tracks, is shown by way of curve (b). The rise time decreases from 66 µsec to 10 µsec.

The invention is of course not limited to the examples described hereinbefore. For example, the through-metallizations 16 in FIG. 1 may be formed as a single through-metallization (shown by way of broken lines 16' in FIG. 1). The examples of FIGS. 1 to 3 showed a liquid crystal pixel. The invention is also applicable to organic light-emitting display devices.

A combination of one or more of the above-mentioned possibilities is also applicable in practice.

The protective scope of the invention is not limited to the embodiments described.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

What is claimed is:

1. A display device comprising a flexible substrate with a matrix of pixels on the substrate, switching elements which are selectable by means of row electrodes for presenting data, which have been presented via column electrodes, to the pixels, wherein parts of the column electrodes are arranged parallel to manually separate strips of a conducting material, or parts of the row electrodes are arranged parallel to mutually separate strips of a conducting material.

2. A display device as claimed in claim 1, wherein parts of the column electrodes are arranged parallel to mutually separate strips of conducting material which are electrically insulated from the column electrodes, or parts of the row electrodes are arranged parallel to mutually separate strips of a conducting material which are electrically insulated from the row electrodes.

3. A display device as claimed in claim 1, wherein the strips of a conducting material have a dimension which, in the direction off the column electrode, is substantially equal to the length of a pixel in the direction of the column electrode, reduced by the width of a row electrode.

4. A display device as claimed in claim 1, wherein the strips of a conducting material have a dimension which, in the direction of the row electrode, is substantially equal to the length of a pixel in the direction of the row electrode, reduced by the width of a column electrode.

5. A display device as claimed in claim 1, wherein the strips or a conducting material in the direction of the column electrode or in the direction of the row electrode have substantially the same pitch as the pixels in the corresponding directions.

6. A display device as claimed in claim 1, wherein the strips of conducting material and the row electrodes are made of the same material.

7. A display device as claimed in claim 1, wherein the strips of conducting material and the column electrodes are made of the same material.

8. A display device as claimed in claim 1, wherein the semiconductor material comprises an organic material.

9. A display device an claimed in claim 1, wherein insulating layers comprise an organic material.

10. A display device as claimed in claim 1, wherein the pixels comprise an organic material.

11. A display device as claimed in claim 9, wherein the pixels form part of a liquid crystal material or comprise an organic luminescent material.

\* \* \* \* \*